US008182896B2

(12) United States Patent
Dack et al.

(10) Patent No.: US 8,182,896 B2
(45) Date of Patent: May 22, 2012

(54) METHOD AND APPARATUS FOR MAKING OPTICAL TILES

(75) Inventors: Marcus Dack, Schofield, WI (US); Bradley J. Zeeff, Zeeland, MI (US)

(73) Assignee: Dri-Design, LLC, Holland, MI (US)

( * ) Notice: Subject to any disclaimer, the term of this patent is extended or adjusted under 35 U.S.C. 154(b) by 162 days.

(21) Appl. No.: 12/725,046

(22) Filed: Mar. 16, 2010

(65) Prior Publication Data

US 2011/0081556 A1 Apr. 7, 2011

Related U.S. Application Data

(60) Provisional application No. 61/248,511, filed on Oct. 5, 2009.

(51) Int. Cl.
*B32B 3/10* (2006.01)
*B21D 31/04* (2006.01)

(52) U.S. Cl. ......................... 428/132; 428/597; 428/119

(58) Field of Classification Search .................. 359/290, 359/291, 292, 298, 478, 479; 40/563, 582, 40/800; 428/597, 132, 119
See application file for complete search history.

(56) References Cited

U.S. PATENT DOCUMENTS 6,712,473 B2 3/2004 Kurematsu
6,829,092 B2 12/2004 Amm et al.
2008/0301986 A1 12/2008 Quin

FOREIGN PATENT DOCUMENTS

WO WO 2006/000087 * 1/2006

OTHER PUBLICATIONS

Georgia Straight, "Lightvision" Feb. 15, 2007, Vancouver Free Press, http://www.straight.com/print/70855.*

* cited by examiner

*Primary Examiner* — Timothy Speer
*Assistant Examiner* — Daniel J Schleis
(74) *Attorney, Agent, or Firm* — Warner Norcross & Judd LLP

(57) ABSTRACT

A panel comprising a substrate having a top substrate surface and a bottom substrate surface. The substrate includes a plurality of tiles extending outwardly from the top substrate surface of substrate. The tiles having a top tile surface and a bottom tile surface. The tiles and the substrate are integral and formed of a single piece of material. Each tile is connected to the substrate at a connection area. Each connection area projects upwardly from the top substrate surface of the substrate and includes a bottom connection edge connected to the top substrate surface of the substrate at a first angle and a top connection edge connected to a bottom tile surface of one of the tiles at a second angle. The tiles form an optical image on the panel.

9 Claims, 12 Drawing Sheets

METHOD AND APPARATUS FOR MAKING OPTICAL TILES

CROSS-REFERENCE TO RELATED APPLICATION

This application claims priority to U.S. Provisional Patent Application No. 61/248,511 filed Oct. 5, 2009, entitled METHOD AND APPARATUS FOR MAKING OPTICAL TILES.

FIELD OF THE INVENTION

The present invention relates to a building, and in particular to an exterior or interior wall of a building.

SUMMARY OF THE PRESENT INVENTION

An aspect of the present invention is to provide a panel comprising a substrate having a top substrate surface and a bottom substrate surface. The substrate includes a plurality of tiles extending outwardly from the top substrate surface of the substrate. The tiles have a top tile surface and a bottom tile surface. The tiles and the substrate are integral and formed of a single piece of material. Each tile is connected to the substrate at a connection area. Each connection area projects upwardly from the top substrate surface of the substrate and includes a bottom connection edge connected to the top substrate surface of the substrate at a first angle and a top connection edge connected to a bottom tile surface of one of the tiles at a second angle. The tiles form an optical image on the panel.

Another aspect of the present invention is to provide a panel comprising a metal substrate having a top substrate surface and a bottom substrate surface. The substrate includes a plurality of tiles extending outwardly from the top substrate surface of substrate. The tiles have a top tile surface and a bottom tile surface. The tiles and the substrate are integral and formed of a single piece of metal. Each tile is connected to the substrate at a connection area. Each connection area projects upwardly from the top substrate surface of the substrate and includes a bottom connection edge connected to the top substrate surface of the substrate and a top connection edge connected to a bottom tile surface of one of the tiles. The substrate includes a plurality of openings, with each opening having a periphery. Each connection area is connected to the substrate within one of the openings at the periphery. At least two of the connection areas are connected to the openings at different points of the periphery of the openings such that at least two of the tiles extend from the substrate in different directions to allow the tiles to form an optical image. The connection area comprises a plurality of linear connection segments.

Yet another aspect of the present invention is to provide a method of forming an optical panel comprising providing a substrate having a top substrate surface and a bottom substrate surface, punching a plurality of tiles outwardly from the top substrate surface of substrate, with the tiles having a top tile surface and a bottom tile surface, integrally forming the tiles and the substrate from a single piece of material, connecting each tile to the substrate at a connection area, and projecting each connection area upwardly from the top substrate surface of the substrate, with a bottom connection edge connected to the top substrate surface of the substrate at a first angle and a top connection edge connected to a bottom tile surface of one of the tiles at a second angle.

These and other aspects, objects, and features of the present invention will be understood and appreciated by those skilled in the art upon studying the following specification, claims, and appended drawings.

DETAILED DESCRIPTION OF PREFERRED EMBODIMENTS

Figure 1:
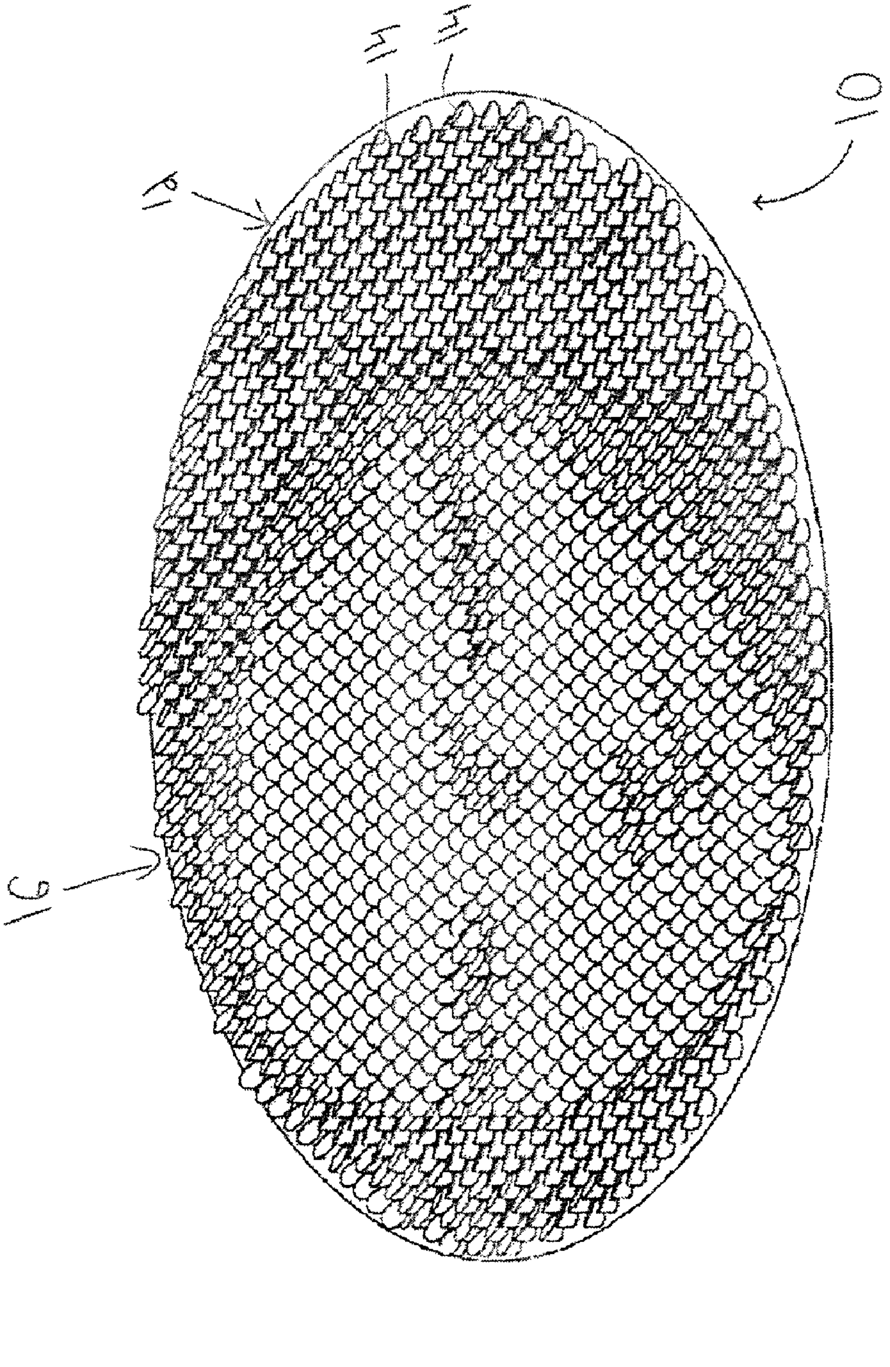
FIG. 1 is a first perspective view of a panel having optical tiles of the present invention.

Reference will now be made in detail to the present preferred embodiments of the invention, examples of which are illustrated in the accompanying drawings. Wherever possible, the same reference numerals will be used throughout the drawings to refer to the same or like parts.

For purposes of description herein, the terms "upper," "lower," "right," "left," "rear," "front," "vertical," "horizontal," "top," "bottom," and derivatives thereof shall relate to the invention as viewed in FIG. 1. However, it is to be understood that the invention may assume various alternative orientations, except where expressly specified to the contrary. It is also to be understood that the specific device illustrated in the attached drawings and described in the following specification is simply an exemplary embodiment of the inventive concepts defined in the appended claims. Hence, specific dimensions, proportions, and other physical characteristics relating to the embodiment disclosed herein are not to be considered as limiting, unless the claims expressly state otherwise.

Figure 2:
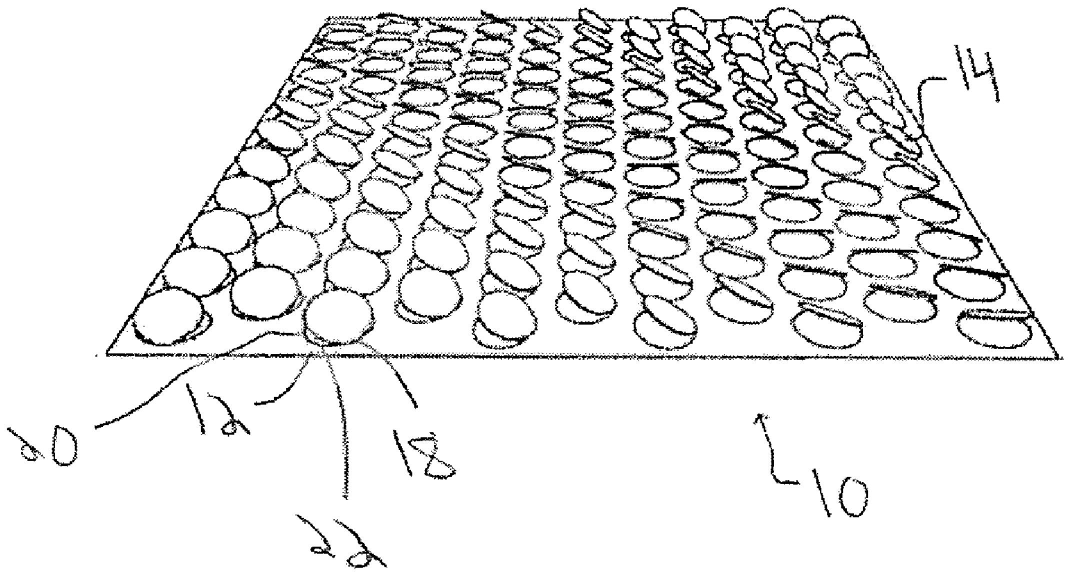
FIG. 2 is a second perspective view of the panel having optical tiles of the present invention.

An aspect of the present invention is drawn to a method of making optical panels along with the equipment used in the method of making the optical panels and the resulting panels. FIGS. 1 and 2 illustrate an optical panel 10 comprising a substrate 12 having a plurality of optical tiles 14 projecting therefrom, with the optical tiles 14 forming an image 16. Each of the optical tiles 14 includes a connection area 18 for connecting the optical tile 14 to the substrate 12. The connection area 18 for each optical tile 14 is at a particular point on a circumference 20 of a circular opening 22, wherein the optical tiles 14 have different angles of reflection in order to form the image 16. U.S. Patent Application Publication No. 2008/0301986 entitled SCULPTURAL IMAGING WITH OPTICAL TILES, the entire contents of which are incorporated herein by reference, discloses a method for determining the angles of reflection of the optical tiles 14 in order to form the image 16. An aspect of the present invention is to form the optical panel 10 out of material used to form an exterior of a building. For example, the optical panel 10 can be formed of metal (e.g., aluminum)

Figure 3:
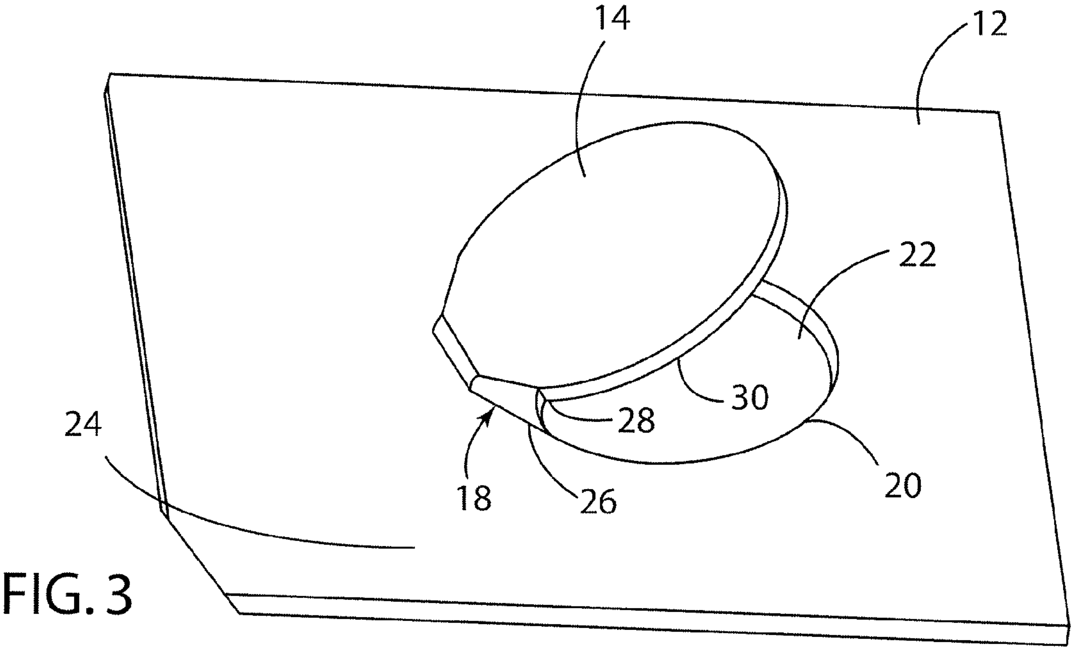
FIG. 3 is a perspective view of the panel and optical tile of the present invention.
Figure 4:
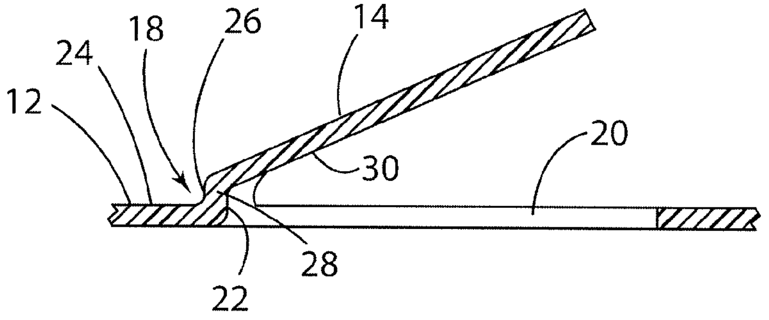
FIG. 4 is a cross section view of the panel and optical tile of the present invention.
Figure 5:
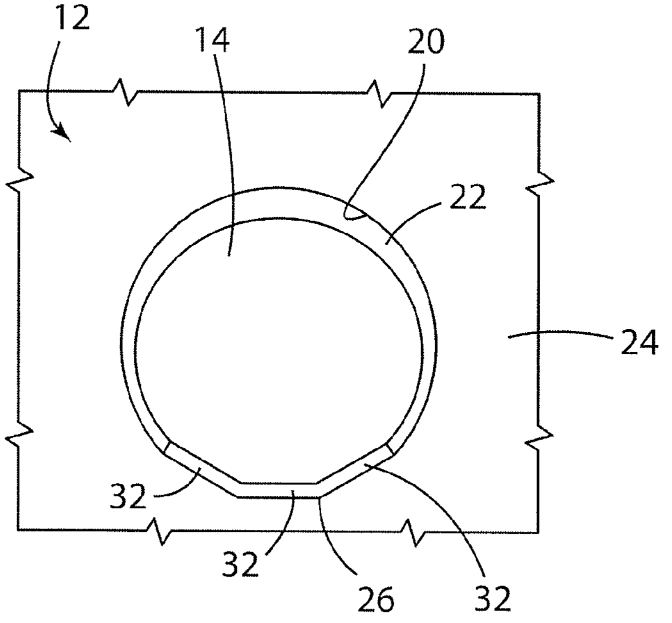
FIG. 5 is a top view of the optical tile of the present invention.

The illustrated optical panel 10 (FIGS. 1 and 2) comprises the substrate 12 having the plurality of optical tiles 14 projecting therefrom. In the illustrated example, the optical tiles 14 are punched or positioned outward from the substrate 12 and therefore are of the same material as the substrate 12. FIG. 3 illustrates a close-up view of one of the optical tiles 14. Each optical tile 14 projects from the circumference 20 of the circular opening 22 at the connection area 18. As illustrated in FIGS. 3 and 4, the connection area 18 projects substantially perpendicularly from a top surface 24 of the substrate 12 and includes a bottom edge 26 connected to the top surface 24 of the substrate 12 and a top edge 28 connected to a bottom surface 30 of the optical tile 14. The connection area 18 is substantially arcuate with the connection area 18 forming approximately 70°-80° of a circle and with the portion of the optical tile 14 not connected to the connection area 18 forming approximately 280°-290° of a circle. Other angles could be used (e.g., the connection area 18 forming approximately 30°-40° of a circle and with the portion of the optical tile 14 not connected to the connection area 18 forming approximately 320°-330° of a circle). It is contemplated that the connection area 18 can form a segment of a circle (and therefore be substantially rounded) or the connection area 18 can comprise a plurality of substantially linear segments 32 (as illustrated in FIG. 5). It is believed that the plurality of substantially linear segments 32 provides superior support for the optical tile 14 to prevent the optical tile 14 from bending towards or away from the substrate 12. It is further believed that three linear segments 32 optimizes a combination of support for the optical tile 14 to prevent the optical tile 14 from bending towards or away from the substrate 12 and ease of manufacture. Although the optical tile 14 and the opening 22 are illustrated as being circular, it is contemplated that the optical tile 14 and the opening 22 could have any geometric peripheral shape. Furthermore, while the optical tile 14 is illustrated as being angled relative to the top surface 24 of the substrate 12 at an angle of approximately 30°, it is contemplated that other angles could be used.

Figure 6:
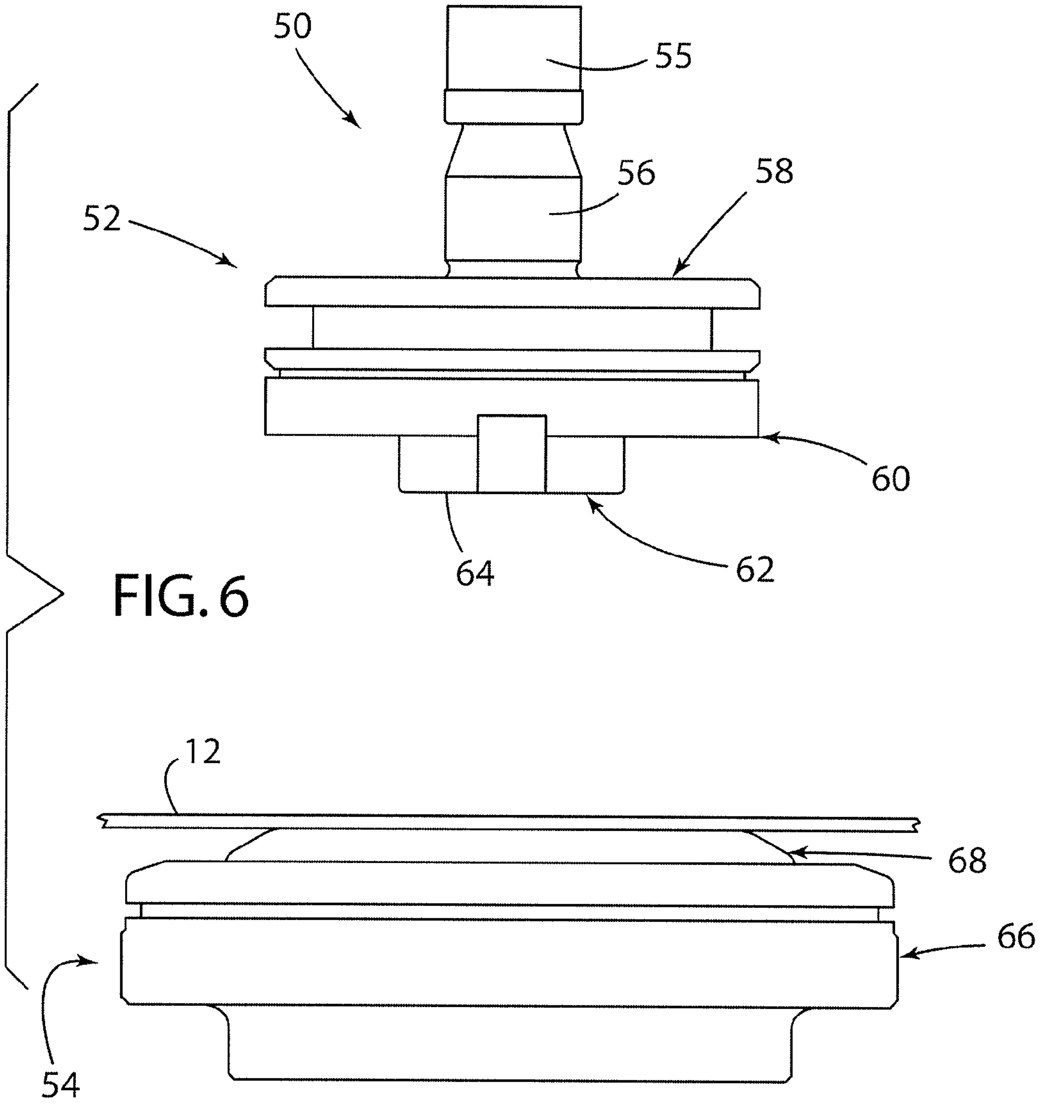
FIG. 6 is a side view of a first apparatus for making the panel with optical tiles of the present invention.
Figure 7:
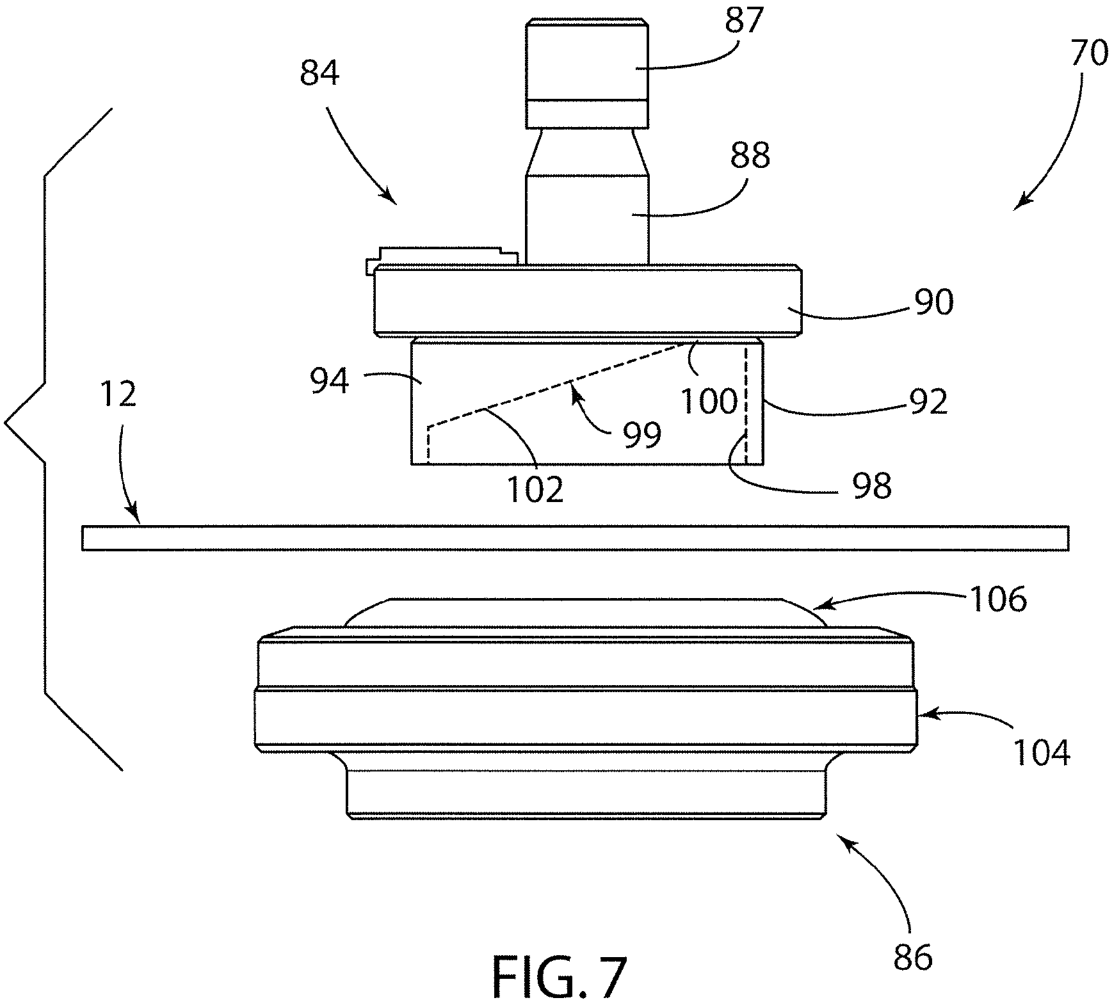
FIG. 7 is a side view of a second apparatus for making the panel with optical tiles of the present invention.

FIG. 6 illustrates a first apparatus 50 for making the panel 10 with optical tiles 14 of the present invention and FIG. 7 illustrates a second apparatus 70 for making the panel 10 with optical tiles 14 of the present invention. The first apparatus 50 is configured to make the opening 22 in the substrate 12. The second apparatus 70 is configured to bend the optical tile 14 away from the substrate 12 and to position the optical tile 14 at an angle relative to the substrate 12. The first apparatus 50 and the second apparatus 70 include one manner of making the panel 10. However, it is contemplated that the panel 10 could be made in other manners.

Figure 8:
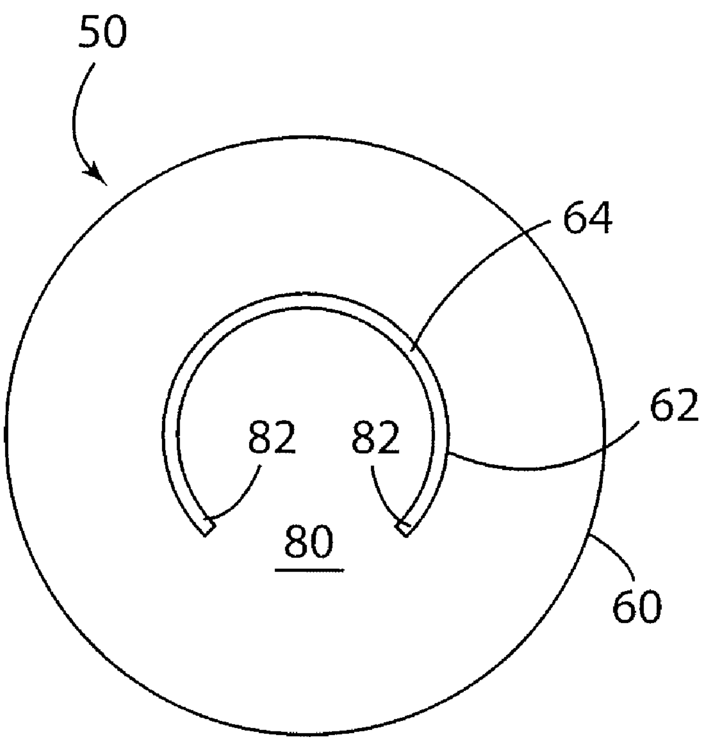
FIG. 8 is a bottom view of the hole punch of the first apparatus for making the panel with optical tiles of the present invention.
Figure 9:
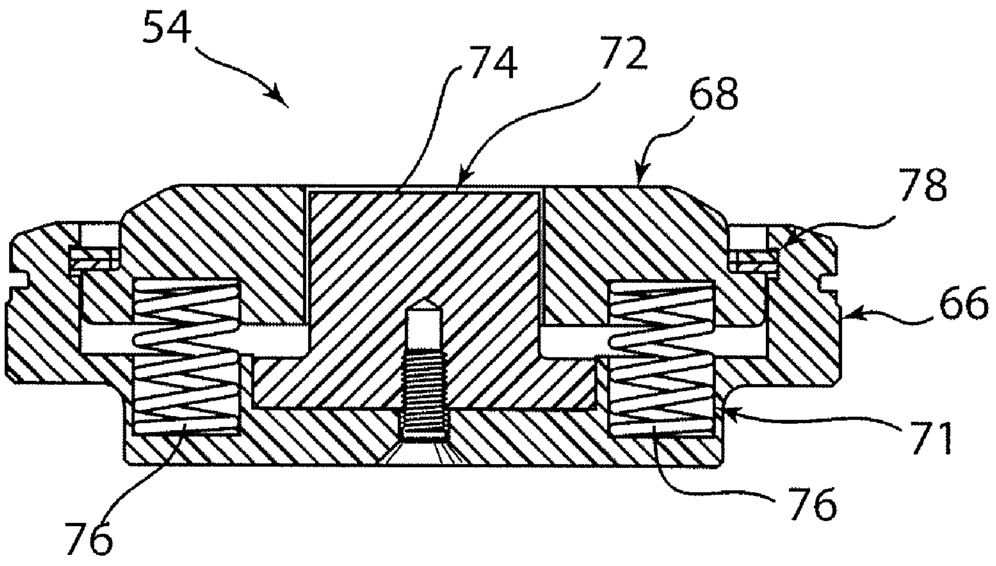
FIG. 9 is a cross-sectional view of a hole punch receiver of the first apparatus for making the panel with optical tiles of the present invention.
Figure 10:
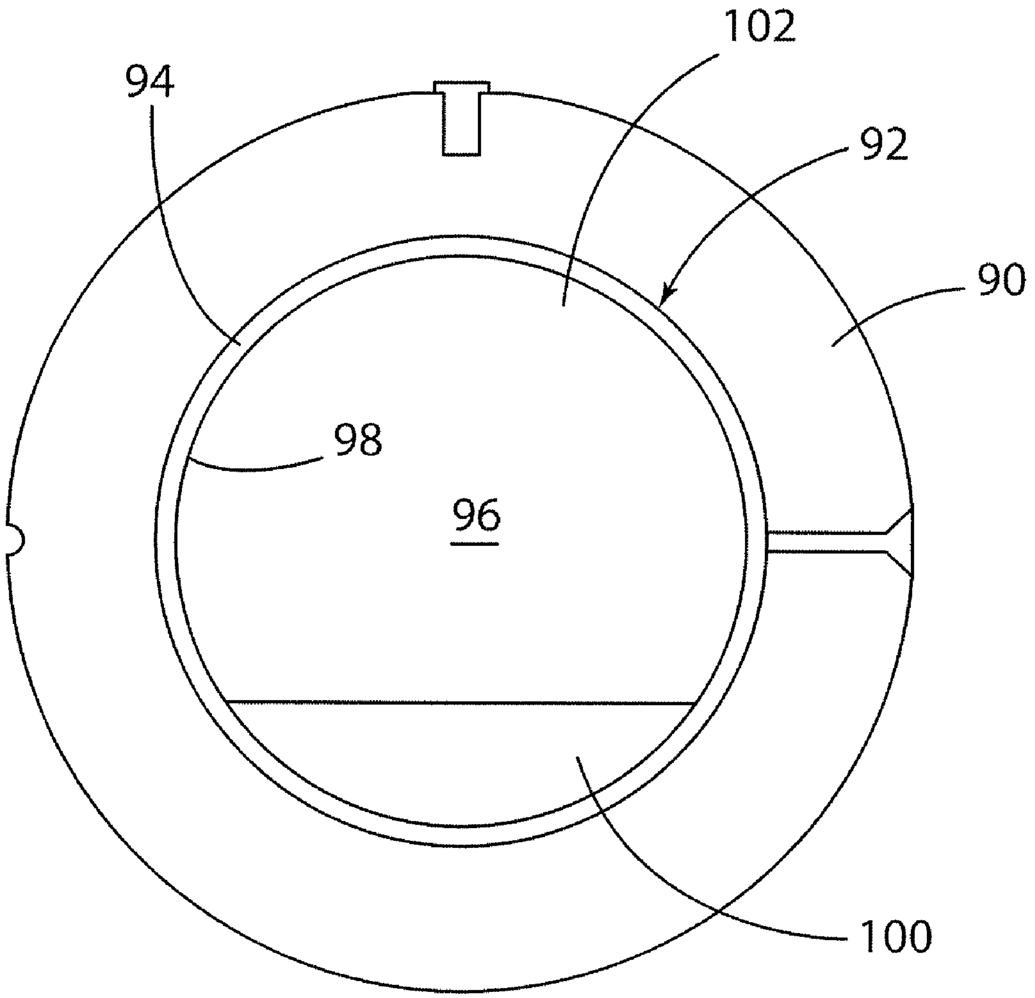
FIG. 10 is a bottom view of a tile punch of the second apparatus for making the panel with optical tiles of the present invention.

In the illustrated example, the first apparatus 50 (FIGS. 6 and 8) comprises a hole punch 52 and a hole punch receiver 54. The hole punch 52 includes a connection head 55, a first neck 56, a first alignment ring 58, an upper insert 60 and a first punch 62. The connection head 55 is configured to be connected to a machine that can reciprocate movement of the hole punch 52 along a line. The first neck 56 allows the first connection head 55 to be connected to the reciprocating machine. The first alignment ring 58 is configured to be aligned with the connection head 55 and the first neck 56 to connect the upper insert 60 and the first punch 62 with the first alignment ring 58, the connection head 55 and the first neck 56. The first punch 62 includes a punch surface 64 configured to punch a hole through the substrate 12 in order to form the opening 22. As illustrated in FIG. 8, the punch surface 64 forms a portion of a circle. Although the punch surface 64 is illustrated as forming approximately 280°-290° of a circle, it is contemplated that the punch surface 64 could form more or less of a circle. Furthermore, while the punch surface 64 is illustrated as being circular, it is contemplated that the punch surface 64 could have other shapes.

The illustrated hole punch receiver 54 of the first apparatus 50 is configured to have the substrate 12 placed thereon during formation of the opening 22. The hole punch receiver 54 comprises a first stationary die 66, a first stripper plate 68, a first biasing member 71 and a first lower insert 72. The first stationary die 66 is configured to remain stationary during the formation of the opening 22 in the substrate 12. The first lower insert 72 is connected to the first stationary die 66 (or integral therewith) and is configured to be received within the first punch 62 during formation of the opening 22. The first lower insert 72 includes a substantially circular top surface 74. The top surface 74 conforms to the area within the first punch 62 of the hole punch 52. The first stripper plate 68 surrounds the first lower insert 72. The first biasing member 71 is located between the first stripper plate 68 and the first stationary die 66 and forces the first stripper plate 68 upward. In the illustrated embodiment, the first biasing member 71 comprises a plurality of springs 76. However, it is contemplated that the first biasing member 71 could comprise any member that would force the first stripper plate 68 upward relative to the first stationary die 66. A retaining ring 78 is connected to the first stationary die 66 and limits upward travel of the first stripper plate 68.

In use, the substrate 12 is positioned against the top of the hole punch receiver 54 and the hole punch 52 is moved into engagement with the hole punch receiver 54 to form the opening 22. As discussed above, the connection area 18 for each optical tile 14 is at a particular point on a circumference 20 of a circular opening 22. Therefore, the substrate 12 is positioned against the top of the hole punch receiver 54 such that the connection area 18 is in the proper location. For example, if the connection area 18 is to be located at the three o'clock position on a circle and the first punch 62 of the hole punch 52 is positioned such that the space 80 between the ends 82 of the punch surface 64 (see FIG. 8) is at the six o'clock position on a circle, the panel is rotated 90° clockwise before the hole punch 52 is activated. Likewise, if the connection area 18 is to be located at the nine o'clock position on a circle and the first punch 62 of the hole punch 52 is positioned such that the space 80 between the ends 82 of the punch surface 64 (see FIG. 8) is at the six o'clock position on a circle, the panel is rotated 90° counter-clockwise before the hole punch 52 is activated. It is contemplated that several punches could be made in the substrate 12 to form the opening 22.

In the illustrated example, after the substrate 12 has been properly positioned, the hole punch 52 is lowered to punch the opening 22 in the substrate 12. First, the first punch 62 punches the opening 22 in the substrate 12. Second, after the first punch 62 punches through the substrate 12, the punch surface 64 abuts against first stripper plate 68, moving the first stripper plate 68 downward against the bias of the first biasing member 71. The first stripper plate 68 allows the first punch 62 to move downward and through the substrate 12 and to punch out a portion of the substrate 12 forming the opening 22. Furthermore, the first lower insert 72 supports the substrate such that the substrate 12 does not substantially deform (e.g., remains planar) while the opening 22 is formed. After the opening 22 is formed in the substrate, the substrate is moved to the second apparatus 70 to form the finished panel 10.

The illustrated second apparatus 70 (FIGS. 7 and 10-13) for making the panel 10 with optical tiles 14 of the present invention bends the optical tile 14 away from the substrate 12 and positions the optical tile 14 at an angle relative to the substrate 12. The second apparatus 70 includes a tile punch 84 and a tile punch receiver 86. The tile punch 84 includes a second connection head 87, a second neck 88, a second alignment ring 90 and a second punch 92. The second connection head 87 is configured to be connected to a machine that can reciprocate movement of the tile punch 84 along a line. The second neck 88 allows the second connection head 87 to be connected to the reciprocating machine. The second alignment ring 90 is configured to be aligned with the second connection head 87 and the second neck 88 to connect the second punch 92 with the second alignment ring 90, the second connection head 87 and the second neck 88. It is noted that the second connection head 87 and the second neck 88 of the second apparatus 70 could be the same first connection head 55 and first neck 56 of the first apparatus 50, with the first connection head 55 and first neck 56 of the first apparatus 50 being reused (i.e., the first alignment ring 58, the upper insert 60 and the first punch 62 being removed from the first connection head 55 and first neck 56 and then connecting the second connection head 87 and second neck 88 to the second alignment ring 90 and second punch 92, thereby turning the hole punch 52 into the tile punch 84).

Figure 11:
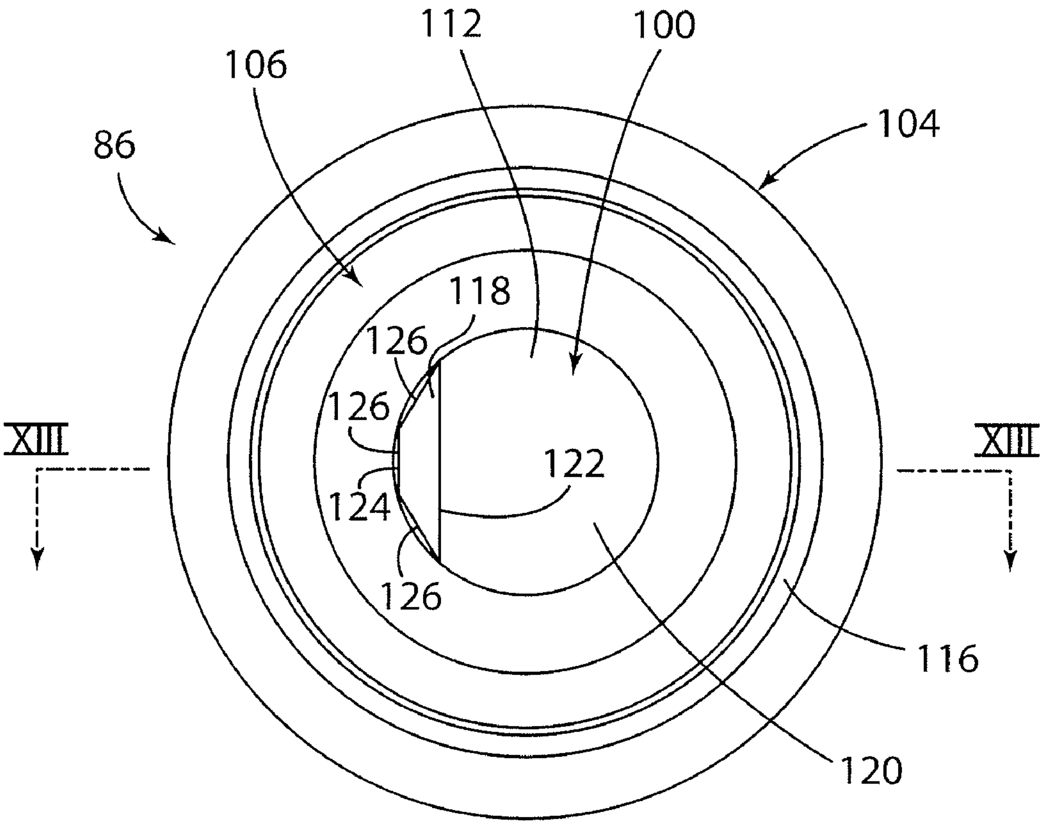
FIG. 11 is a top view of a tile punch receiver of the second apparatus for making the panel with optical tiles of the present invention.

The illustrated second punch 92 is configured to unite with the tile punch receiver 86 to form the optical tile 14. The second punch 92 includes a cylindrical outside tube 94 and a tile receiving interior 96 within the cylindrical outside tube 94. A peripheral wall 98 of the tile receiving interior 96 is also substantially cylindrical. A top surface 99 of the tile receiving interior 96 includes a horizontal portion 100 and an angled portion 102. Both the horizontal portion 100 and the angled portion 102 are substantially flat. As illustrated in FIG. 11, a bottom view of the horizontal portion 100 and the angled portion 102 show the top surface 99 as forming a circle.

Figure 12:
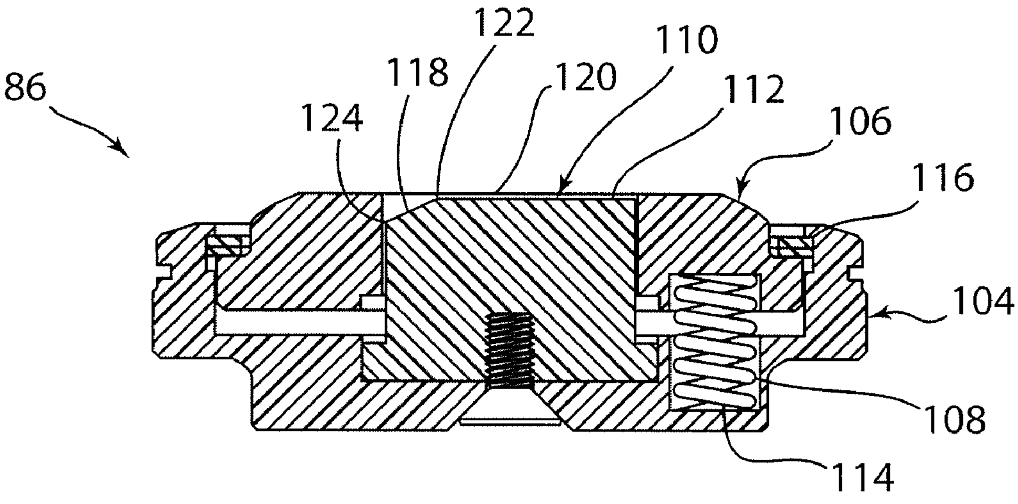
FIG. 12 is a cross-sectional view of the tile punch die punch receiver of the second apparatus for making the panel with optical tiles of the present invention taken along the line XIII-XIII of FIG. 11.
Figure 13:
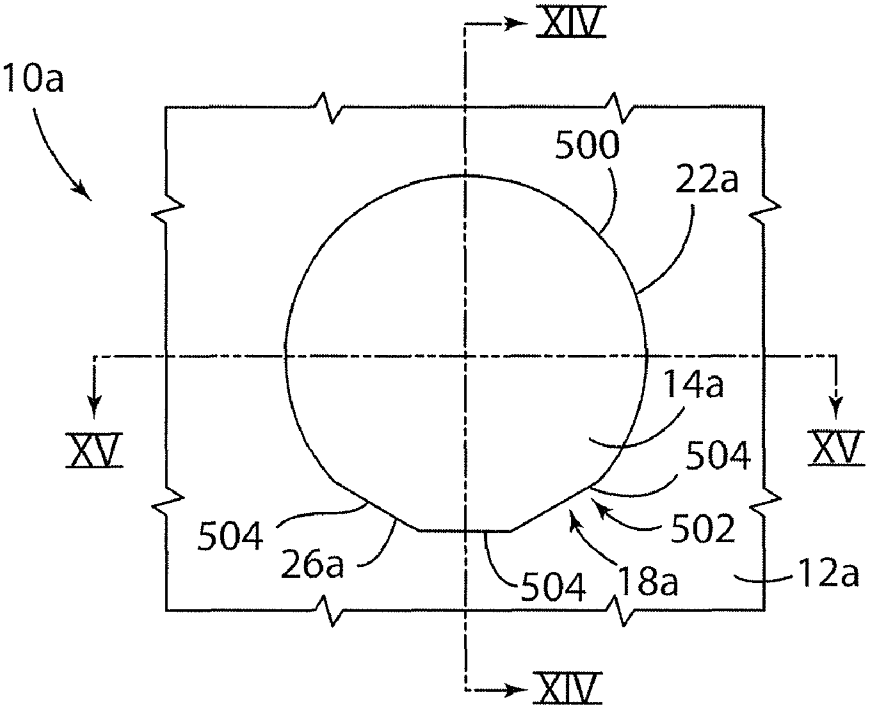
FIG. 13 is a top view of a panel of a second embodiment of the present invention before the tile is angled.

The illustrated tile punch receiver 86 of the second apparatus 70 is configured to have the substrate 12 placed thereon during formation of the optical tile 14. The tile punch receiver 86 comprises a second stationary die 104, a second stripper plate 106, a second biasing member 108 and a second lower insert 110. The second stationary die 104 is configured to remain stationary during the formation of the optical tile 14. The second lower insert 110 is connected to the second stationary die 104 (or integral therewith) and is configured to be received within the second punch 92 during formation of the optical tile 14. As illustrated in FIGS. 12 and 13, the second lower insert 110 includes a top surface 112 configured to form the optical tile 14. The second stripper plate 106 surrounds the second lower insert 110. The second biasing member 108 is located between the second stripper plate 106 and the second stationary die 104 and forces the second stripper plate 106 upward. In the illustrated embodiment, the second biasing member 108 comprises a spring 114. However, it is contemplated that the second biasing member 108 could comprise any member that would force the second stripper plate 106 upward relative to the second stationary die 104. A second retaining ring 116 is connected to the second stationary die 104 and limits upward travel of the second stripper plate 106.

In use, the substrate 12 with the opening 22 already formed therein is positioned against the top of the tile punch receiver 86 and the second punch 92 is moved into engagement with the tile punch receiver 86 to form the optical tile 14. As discussed above, the connection area 18 for each optical tile 14 is at a particular point on the circumference 20 of the circular opening 22. Therefore, the substrate 12 is positioned against the top of the tile punch receiver 86 such that the connection area 18 is in the proper location. The top surface 112 of the second lower insert 110 of the tile punch receiver 86 of the second apparatus 70 determines the proper position of the substrate 12 on the tile punch receiver 86. The top surface 112 of the second lower insert 110 includes a first slanted portion 118 and a second flat portion 120. The first slanted portion 118 is angled at the angle that the bottom surface 30 of the optical tile 14 should be angled relative to the top surface 24 of the substrate 12. For example, if the optical tile 14 is angled at 30° as discussed above, the first slanted portion 118 of the top surface 112 of the second lower insert 110 should be angled at 30°. The first slanted portion 118 includes an interface 122 at the second flat portion 120. The interface 122 can be along a line. As illustrated in FIG. 12, an edge 124 of the first slanted portion 118 excluding the interface 122 can be circular or can include a plurality of linear edge portions 126. If the edge 124 has linear edges 126, the number of linear edge portions 126 is identical to the number of substantially linear segments 32 of the connection area 18 of the optical tile 14 as discussed above (as the number of linear edges 126 determines and forms the number of linear segments 32 of the connection area 18). The substrate 12 is positioned against the top of the tile punch receiver 86 such that the connection area 18 is in the proper location when the connection area 18 of the substrate 12 is aligned with and located over the first slanted portion 118.

In the illustrated example, after the substrate 12 has been properly positioned, the second punch 92 is lowered to push the substrate 12 downward. As the substrate 12 is pushed downward, the substrate 12 surrounding the opening 22 in the substrate 12 will force the second stripper plate 106 of the tile punch receiver 86 downward. However, the second lower insert 110 will remain stationary relative to the substrate outside of the opening 22 and the tile second punch 92. The top surface 112 of the second lower insert 110 will push against the bottom surface 30 of the tile 14 to force the tile 14 to bend upward. As the first slanted portion 118 is angled, the tile 14 will also become angled. Furthermore, as discussed above, the edge 124 of the first slanted portion 118 having the linear edge portions 126 will form the linear segments 32 of the connection area 18. During formation of the connection area 18 with the linear segments 32, the tile 14 and the second lower insert 110 will be received within the tile receiving interior 96 within the cylindrical outside tube 94 of the second punch 92. The angled portion 102 of the top surface 99 of the tile receiving interior 96 will abut against the top surface of the tile 14 to keep the tile 14 substantially planar.

The reference numeral 10*a* (FIGS. 13-15) generally designates another embodiment of the present invention, having a second embodiment for the optical panel. Since optical panel 10*a* is similar to the previously described optical panel 10, similar parts appearing in FIGS. 1-5 and FIGS. 13-15, respectively, are represented by the same, corresponding reference number, except for the suffix "a" in the numerals of the latter. The second embodiment of the optical panel 10*a* is similar to the first embodiment of the optical panel 10, except that the second embodiment of the optical panel 10*a* does not include any cut out material between the tile 14*a* and the substrate 12*a*.

Figure 14:
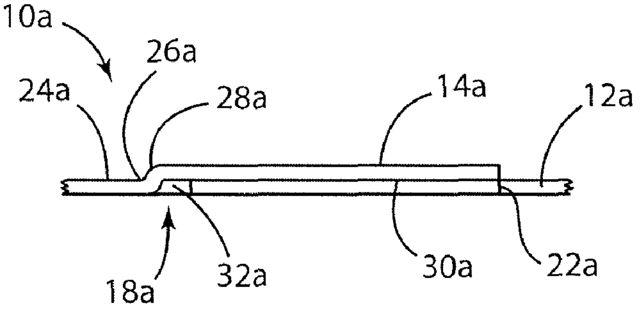
FIG. 14 is a cross-sectional view of the panel of the second embodiment of the present invention taken along the line XIV-XIV of FIG. 13.
Figure 15:
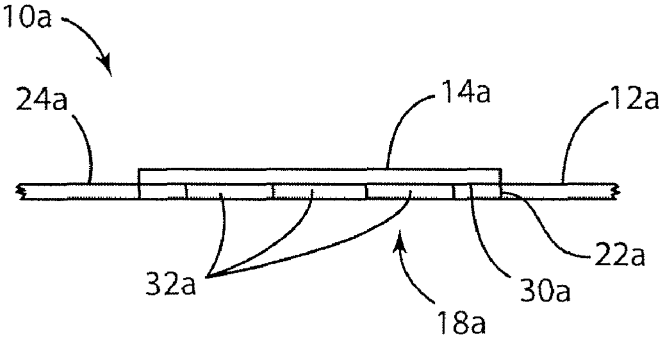
FIG. 15 is a cross-sectional view of the panel of the second embodiment of the present invention taken along the line XV-XV of FIG. 13.

In the second embodiment of the optical panel 10*a*, the tile 14*a* is punched upward from the substrate 12*a* as illustrated in FIGS. 13-15 during a first step of forming the optical panel 10*a*. FIGS. 13-15 show a top view of the optical panel 10*a* after the tile 14*a* is punched out of the substrate 12*a*. The punch forming the tile 14*a* has an outline substantially similar to the outline of the tile 14*a* as illustrated in FIG. 13. Therefore, the punch forms each optical tile 14*a* as a projection from a circumference of the circular opening 22*a*, with the optical tile 14*a* being connected to the substrate 12*a* at the connection area 18*a*. Like the punch, the optical tile 14*a* includes a periphery having first portion 500 (that can be annular as shown) and a second portion 502 forming a plurality of straight edges 504. As illustrated in FIGS. 14 and 15, the tile 14*a* is substantially parallel to the top surface 24*a* of the substrate 12*a* after the first punch. The tile 14*a* can then be punched again (e.g., using the second apparatus 70 as outlined above) to form the tile 14*a* at its proper angle. The tile 14*a* will then be substantially identical to the tile 14 of the first embodiment of the optical panel 10*a*, except the tile 14*a* will have more material because the first punch (or first apparatus) will not remove any material from the substrate 12*a*. Therefore, the tile 14*a* will include a connection area 18*a* that projects substantially perpendicularly from a top surface 24*a* of the substrate 12*a* and includes a bottom edge 26*a* connected to the top surface 24*a* of the substrate 12*a* and a top edge 28*a* connected to a bottom surface 30*a* of the optical tile 14*a*. The connection area 18*a* is substantially arcuate with the connection area 18*a* forming approximately 70°-80° of a circle and with the portion of the optical tile 14*a* not connected to the connection area 18*a* forming approximately 280°-290° of a circle. It is contemplated that the connection area 18*a* can form a segment of a circle (and therefore be substantially rounded) or the connection area 18*a* can comprise a plurality of substantially linear segments 32*a* (as illustrated in FIGS. 13-15). Although the optical tile 14*a* and the opening 22*a* are illustrated as being circular, it is contemplated that the optical tile 14*a* and the opening 22*a* could have any geometric peripheral shape.

Figure 16:
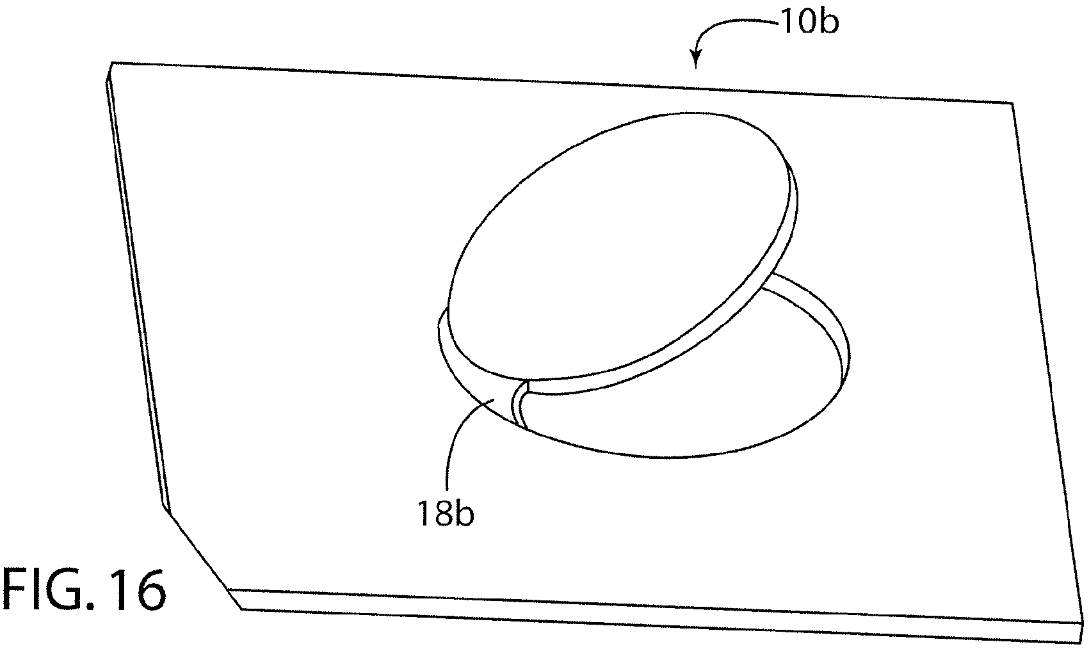
FIG. 16 is a perspective view of the panel and optical tile of a third embodiment of the present invention.
Figure 17:
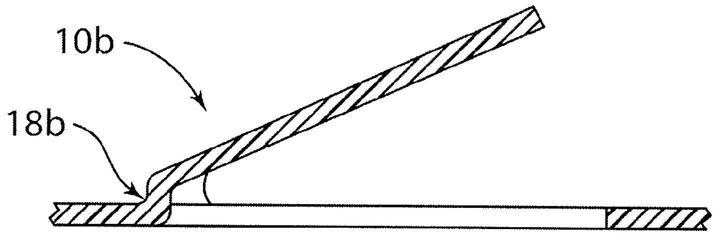
FIG. 17 is a cross section view of the panel and optical tile of the third embodiment of the present invention.
Figure 18:
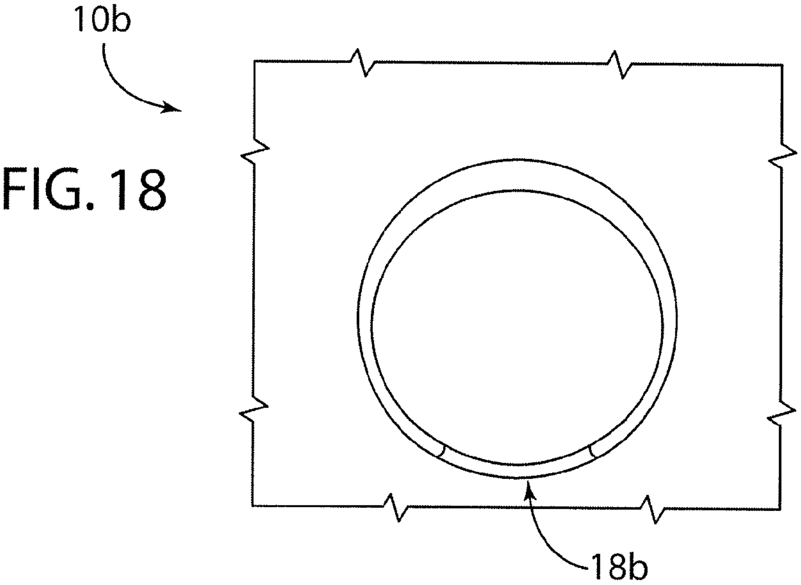
FIG. 18 is a top view of the optical tile of the third embodiment of the present invention.
Figure 19:
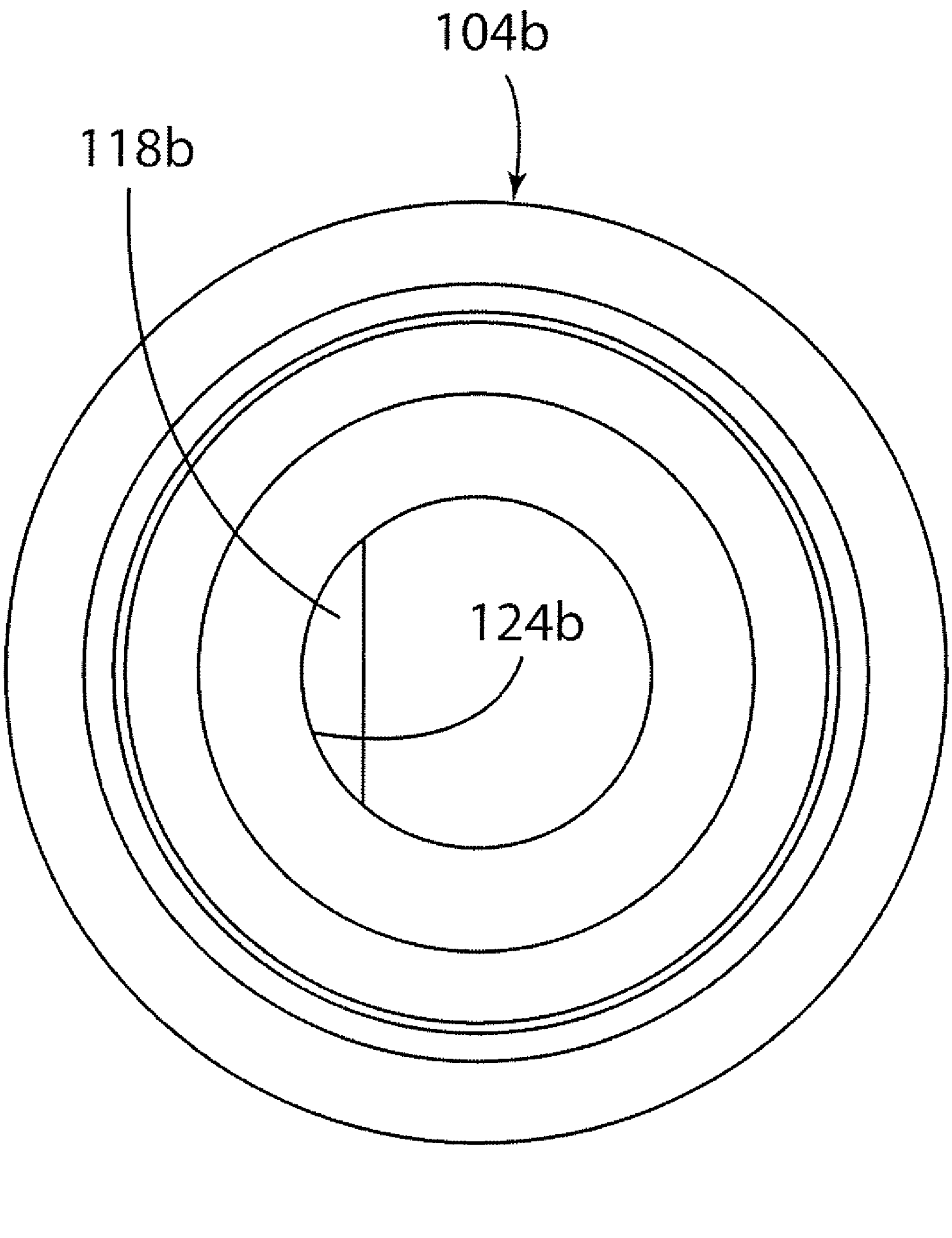
FIG. 19 is a top view of a tile punch receiver of the second apparatus for making the panel with optical tiles of the third embodiment of the present invention.

The reference numeral 10*b* (FIGS. 16-18) generally designates another embodiment of the present invention, having a third embodiment for the optical panel. Since optical panel 10*b* is similar to the previously described optical panel 10, similar parts appearing in FIGS. 1-5 and FIGS. 16-18, respectively, are represented by the same, corresponding reference number, except for the suffix "b" in the numerals of the latter. The third embodiment of the optical panel 10*b* is substantially identical to the first embodiment of the optical panel 10, except the connection area 18*b* is arcuate instead of comprising comprise a plurality of substantially linear segments 32 as illustrated in FIG. 5. FIG. 19 illustrates a second stationary die 104*b* of the tile punch receiver substantially identical to the secondary stationary die 104 of the first embodiment, except that the edge 124*b* of first slanted portion 118*b* is circular instead of including a plurality of linear edge portions 126.

Figure 20:
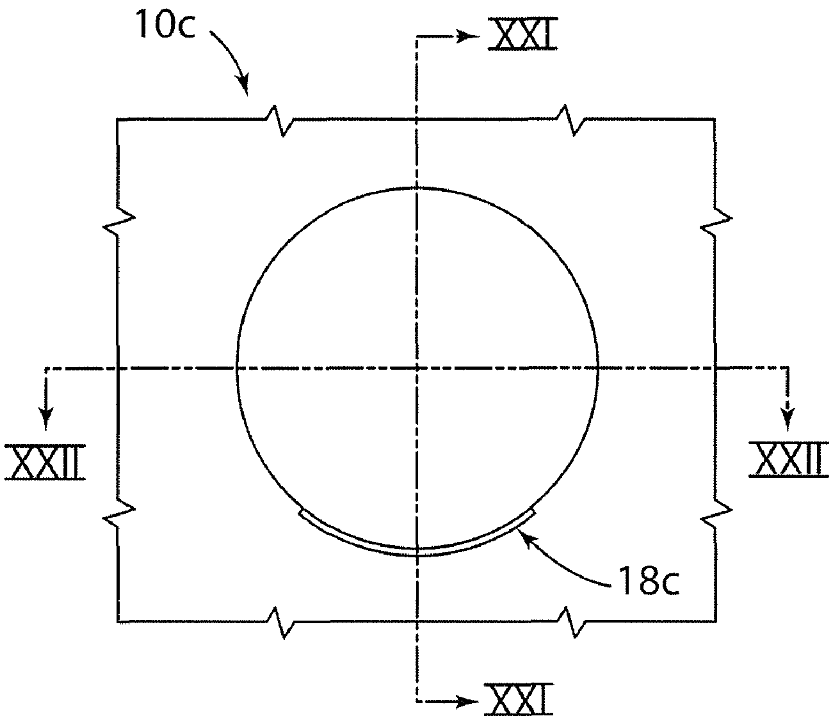
FIG. 20 is a top view of a panel of a fourth embodiment of the present invention before the tile is angled.
Figure 21:
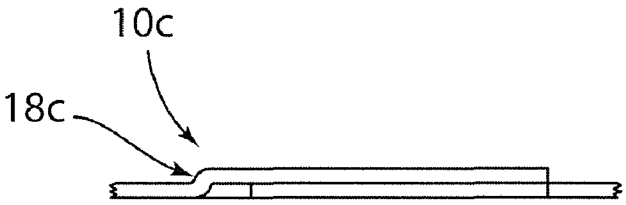
FIG. 21 is a cross-sectional view of the panel of the fourth embodiment of the present invention taken along the line XIV-XIV of FIG. 13.
Figure 22:
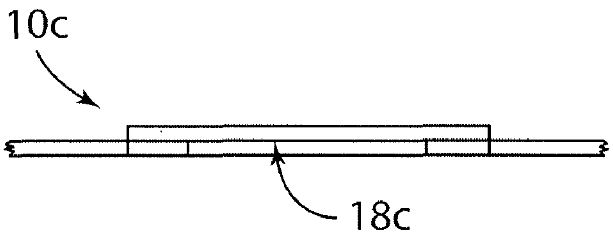
FIG. 22 is a cross-sectional view of the panel of the fourth embodiment of the present invention taken along the line XV-XV of FIG. 13.

The reference numeral 10*c* (FIGS. 20-22) generally designates another embodiment of the present invention, having a fourth embodiment for the optical panel. Since optical panel 10*c* is similar to the previously described optical panel 10*b*, similar parts appearing in FIGS. 13-15 and FIGS. 20-22, respectively, are represented by the same, corresponding reference number, except for the suffix "c" in the numerals of the latter. The fourth embodiment of the optical panel 10*b* is substantially identical to the second embodiment of the optical panel 10*a*, except the connection area 18*c* is arcuate instead of comprising comprise a plurality of substantially linear segments 32*a* as illustrated in FIGS. 13-15.

The above description is considered that of the preferred embodiments only. Modifications of the invention will occur to those skilled in the art and to those who make or use the invention. Furthermore, the foregoing detailed description is considered that of a preferred embodiment only, and the particular shape and nature of at least some of the components in this embodiment are at least partially based on manufacturing advantages and considerations as well as on those pertaining to assembly and operation. Modifications of this embodiment may well occur to those skilled in the art and to those who make or use the invention after learning the nature of this preferred embodiment, and the invention lends itself advantageously to such modification and alternative embodiments. Therefore, it is to be understood that the embodiment shown in the drawings and described above is provided principally for illustrative purposes and should not be used to limit the scope of the invention.

We claim:

1. A panel comprising:

a substrate having a top substrate surface and a bottom substrate surface, the substrate including a plurality of tiles extending outwardly from the top substrate surface of the substrate, the tiles having a top tile surface and a bottom tile surface;

the tiles and the substrate being integral and formed of a single piece of material;

each tile being connected to the substrate at a connection area; and each connection area including a plurality of substantially linear segments angularly offset from one another and projecting upwardly from the top substrate surface of the substrate, each segment including a bottom connection edge connected to the top substrate surface of the substrate at a first angle and a top connection edge connected to a bottom tile surface of one of the tiles at a second angle;

wherein the tiles form an optical image on the panel.

2. The panel of claim 1, wherein:

the substrate includes a plurality of openings, each opening having a periphery;

each connection area is connected to the substrate within one of the openings at the periphery; and at least two of the connection areas are connected to the openings at different points of the periphery of the openings such that at least two of the tiles extend from the substrate in different directions.

3. The panel of claim 2, wherein:

each tile is substantially circular.

4. The panel of claim 1, wherein:

each tile is substantially circular.

5. The panel of claim 1, wherein:

the substrate and the tiles are formed of aluminum.

6. The panel of claim 1, wherein:

the tiles are substantially planar.

7. The panel of claim 1, wherein:

the first angle is substantially perpendicular.

8. A panel comprising:

a metal substrate having a top substrate surface and a bottom substrate surface, the substrate including a plurality of tiles extending outwardly from the top substrate surface of substrate, the tiles having a top tile surface and a bottom tile surface;

the tiles and the substrate being integral and formed of a single piece of metal;

each tile being connected to the substrate at a connection area;

each connection area projecting upwardly from the top substrate surface of the substrate and includes a bottom connection edge connected to the top substrate surface of the substrate and a top connection edge connected to a bottom tile surface of one of the tiles;

the substrate including a plurality of openings, each opening having a periphery;

each connection area being connected to the substrate within one of the openings at the periphery; and at least two of the connection areas being connected to the openings at different points of the periphery of the openings such that at least two of the tiles extend from the substrate in different directions to allow the tiles to form an optical image;

wherein each connection area comprises a plurality of angularly offset linear connection segments extending upwardly from the top substrate surface, whereby the connections segments collectively resist bending of the respective tile toward or away from the substrate.

9. The panel of claim 8, wherein:

each connection area projecting substantially perpendicularly from the top substrate surface of the substrate.

* * * * *